United States Patent
McGrotty et al.

(10) Patent No.: US 11,338,625 B2
(45) Date of Patent: May 24, 2022

(54) AUTOMATIC TIRE INFLATION MONITORING SYSTEM

(71) Applicant: Sensata Technologies, Inc., Attleboro, MA (US)

(72) Inventors: John Paul McGrotty, Newtownabbey (GB); John Greer, Randalstown (GB); David George Galbraith, Comber (GB); Krishna Raj Pradeep, Antrim (GB); Jonathan Primrose, Tempo (GB)

(73) Assignee: Sensata Technolgies, Inc., Attleboro, MA (US)

(*) Notice: Subject to any disclaimer, the term of this patent is extended or adjusted under 35 U.S.C. 154(b) by 0 days.

(21) Appl. No.: 17/192,300

(22) Filed: Mar. 4, 2021

(65) Prior Publication Data

US 2021/0276375 A1  Sep. 9, 2021

Related U.S. Application Data

(60) Provisional application No. 63/020,840, filed on May 6, 2020, provisional application No. 62/985,429, filed on Mar. 5, 2020.

(51) Int. Cl.
*B60C 23/04* (2006.01)
*B60C 23/00* (2006.01)

(52) U.S. Cl.
CPC ........ *B60C 23/0447* (2013.01); *B60C 23/003* (2013.01); *B60C 23/041* (2013.01); *B60C 23/0484* (2013.01)

(58) Field of Classification Search
CPC . B60C 23/0447; B60C 23/003; B60C 23/041; B60C 23/0484

USPC .......................... 340/442–447; 73/146–146.8
See application file for complete search history.

(56) References Cited

U.S. PATENT DOCUMENTS

| | | | | |
|---|---|---|---|---|
| 4,574,267 | A * | 3/1986 | Jones | B60C 23/06 116/34 R |
| 5,767,398 | A * | 6/1998 | Naedler | B60C 23/003 73/146.2 |
| 5,928,444 | A * | 7/1999 | Loewe | B60C 23/004 152/418 |
| 9,731,563 | B2 * | 8/2017 | Stadele | B60C 23/02 |
| 10,471,780 | B2 * | 11/2019 | Matlow | B60C 23/0447 |

(Continued)

OTHER PUBLICATIONS

International Search Report and Written Opinion issued in counterpart International Application No. PCT/US21/020864 dated May 20, 2021.

*Primary Examiner* — Eric Blount
(74) *Attorney, Agent, or Firm* — Mark H. Whittenberger, Esq.; Holland & Knight LLP

(57) ABSTRACT

Embodiments included herein are directed towards an automatic tire inflation monitoring system and method. The method may include confirming, using a battery powered electronic sensor, that there is no active tire re-inflation in progress. The method may further include monitoring, using the battery powered electronic sensor, the status of all tire pressures over a period of time and determining, using the battery powered electronic sensor, whether a rate of tire pressure reduction exceeds a first value. The method may include reporting, using the battery powered electronic sensor, a fault if the rate exceeds the first value.

13 Claims, 11 Drawing Sheets

(56) References Cited

U.S. PATENT DOCUMENTS

| | | | |
|---|---|---|---|
| 2013/0335214 A1* | 12/2013 | Massey | B60C 23/0408 |
| | | | 340/442 |
| 2017/0217261 A1 | 8/2017 | Mays et al. | |
| 2019/0329606 A1 | 10/2019 | Stewart et al. | |
| 2019/0349875 A1* | 11/2019 | Wu | H04W 56/005 |
| 2020/0130437 A1* | 4/2020 | Root | B60C 23/127 |

* cited by examiner

AUTOMATIC TIRE INFLATION MONITORING SYSTEM

CROSS-REFERENCE TO RELATED APPLICATIONS

This application claims the benefit of U.S. Provisional Application No. 62/985,429, filed on Mar. 5, 2020 and claims the benefit of U.S. Provisional Application No. 63/020,840, filed on May 6, 2020. The entire contents of which are incorporated herein by reference.

FIELD OF THE TECHNOLOGY

This disclosure relates to systems and methods for an automatic tire inflation system ("ATIS") and, more particularly, using an ATIS to measure tire leak rates, as well as coordinating sensor measurements in an ATIS and other systems.

BACKGROUND

Automatic tire inflation systems exist in which a constant tire pressure is supplied to all tires for keeping the tires balanced at a set pressure. An ATIS can allow a vehicle to continue to operate safely even if its tires are punctured or otherwise damaged to some extent. Such systems have been applied to tractor-trailer vehicles to great benefit, including extended tire life, increased fuel economy, decreased maintenance, fewer blowouts, improved safety, etc.

One concern with an ATIS is that tire damage may accumulate over time and the operator would be unaware of the accumulated damage due to the operation of the ATIS keeping the tires at the normal set pressure. Thus, the usual indicator of tire damage, i.e., a loss of pressure, is not possible if the ATIS is continuously restoring the loss of air. These systems aren't equipped with a supervisory system in which puncture or other tire damage can be detected and cannot determine how much damage has been done to an individual tire.

Furthermore, many existing wireless sensing systems, including tire pressure monitors, use one way radio links. Control of these sensors and when the sensors report data is limited.

SUMMARY OF THE DISCLOSURE

In one or more embodiments of the present disclosure an automatic tire inflation monitoring method is provided. The method may include confirming, using a battery powered electronic sensor, that there is no active tire re-inflation in progress. The method may further include monitoring, using the battery powered electronic sensor, a status of all tire pressures over a period of time and determining, using the battery powered electronic sensor, whether a rate of tire pressure reduction exceeds a first value. The method may include reporting, using the battery powered electronic sensor, a fault if the rate exceeds the first value.

One or more of the following features may be included. In some embodiments, the method may include determining whether the rate of tire pressure reduction exceeds a second value less than the first value and reporting a different fault if the rate exceeds the second value. The method may further include disabling an automatic pressure restoration function in order to facilitate a measurement and restoring the automatic pressure restoration function after a predetermined time. The method may also include determining, using the battery powered electronic sensor, that an automatic tire inflation system is no longer active. The method may further include receiving, using the battery powered electronic sensor, an indication that an automatic tire inflation system is approaching a restart. In some embodiments, the process may utilize a two-way radio link.

In one or more embodiments of the present disclosure, an automatic tire inflation system is provided. The system may include a plurality of pressure sensors forming part of a wireless network. The system may further include a controller configured to manage a timing function within each of the plurality of sensors to determine a pressure sensed by each of the plurality of sensors at a given time.

One or more of the following features may be included. The controller may determine a flow rate in the system based on a comparison of the pressures sensed by the plurality of sensors. The plurality of sensors may include a battery powered electronic sensor. The plurality of sensors may be configured to determine that an automatic tire inflation system is no longer active. The plurality of sensors may be configured to receive an indication that an automatic tire inflation system is approaching a restart. The plurality of sensors may utilize a two-way radio link.

In one or more embodiments of the present disclosure, an automatic tire inflation system is provided. The system may include a controller and a tire having a wheel end, the system delivering air to an inlet valve at the wheel end. The system may include a first pressure sensor for sensing pressure in the tire and a second pressure sensor for sensing pressure delivered to the inlet valve. The controller may determine a flow rate into the tire based on the pressures sensed by the first and second pressure sensor.

One or more of the following features may be included. The first and/or second pressure sensor may be a battery operated electronic sensor. The controller may quantify tire damage based on the flow rate.

In one or more embodiments of the present disclosure, a method for automatic tire inflation is provided. The method may include providing an automatic tire inflation system (ATIS) on a vehicle and determining that the ATIS is inactive using a battery operated electronic sensor. The method may further include monitoring, using the battery operated electronic sensor, the status of all tire pressures over a period of time and determining, using the battery operated electronic sensor, whether a rate of tire pressure reduction exceeds a first value. The method may further include reporting, using the battery operated electronic sensor, a fault if the rate exceeds the first value.

One or more of the following features may be included. The method may further include determining whether the rate of tire pressure reduction exceeds a second value less than the first value and reporting a different fault if the rate exceeds the second value. The method may also include determining, using the battery powered electronic sensor, that an automatic tire inflation system is no longer active or receiving, using the battery powered electronic sensor, an indication that an automatic tire inflation system is approaching a restart. In some embodiments, determining that the ATIS is inactive may utilize a two-way radio link.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements, and in which.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

The present disclosure will be more completely understood through the following description, which should be read in conjunction with the drawings. In this description, like numbers may refer to similar elements within various embodiments of the present disclosure. The skilled artisan will readily appreciate that the methods apparatus and systems described herein are merely exemplary and that variations can be made without departing from the spirit and scope of the disclosure.

Figure 1:
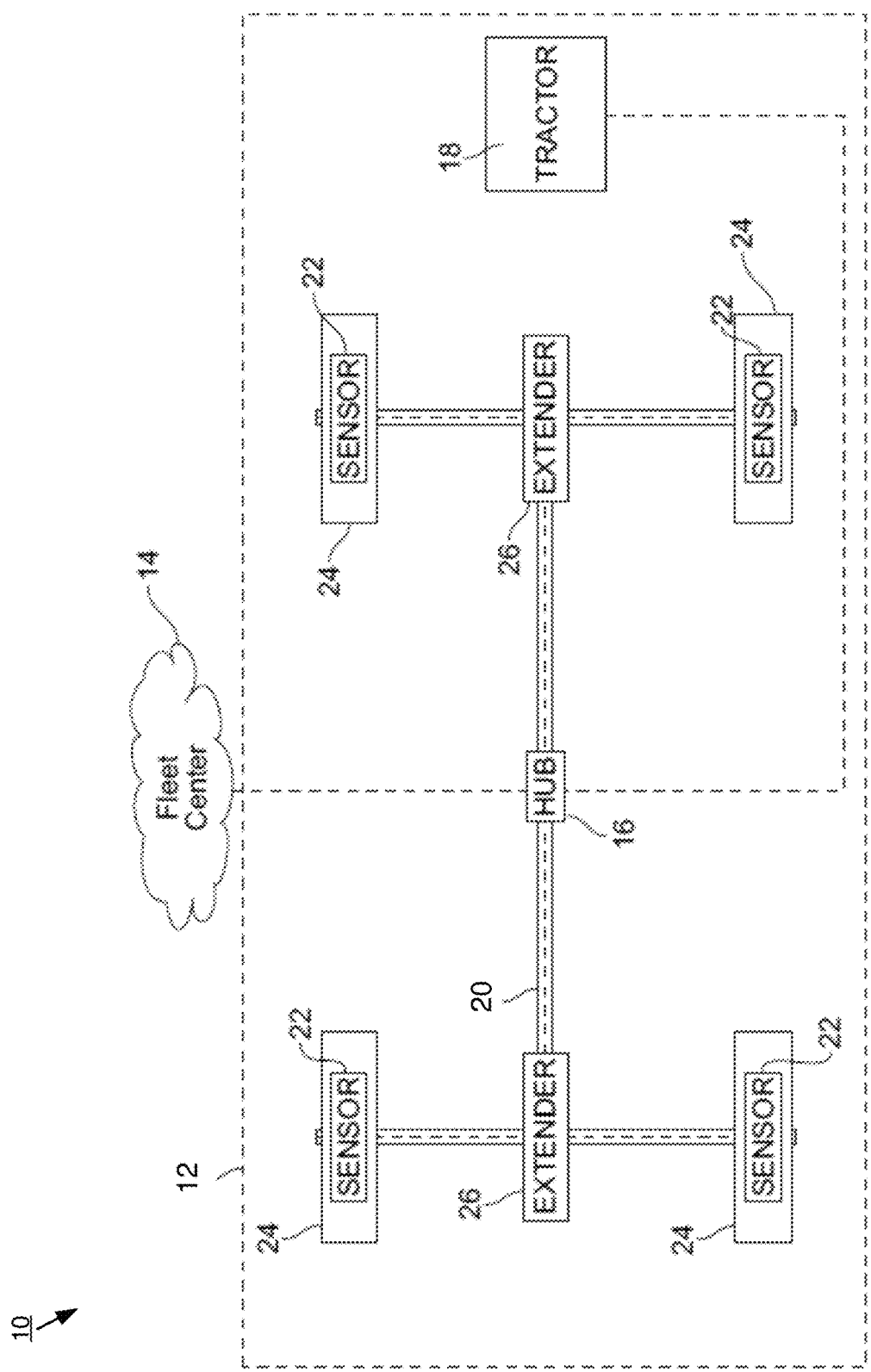
FIG. 1 is schematic view of a tractor-trailer vehicle having a vehicle area network in accordance with one illustrative embodiment of the present disclosure.

Referring to FIG. 1, a schematic view of a tractor-trailer vehicle 10 having a vehicle area network (VAN) 12 is shown. The VAN 12 may be in communication with a remote fleet center 14 using a cellular network or any other suitable approach. Fleet center 14 may send and receive data to and from plurality of vehicles 10. VAN 12 may include at least one hub 16. Hub 16 may be physically centrally located on a trailer portion 20 or on a tractor portion 18. VAN 12 may include a microcontroller, preferably integrated into hub 16, for controlling the systems.

In some embodiments, hub 16 may include a wireless gateway for managing communication within VAN 12 and between fleet center 14 and VAN 12. Hub 16 may communicate directly with a plurality of sensors 22 of different types and in various locations. For example, sensors 22 are shown associated with wheels 24. As needed, range extenders 26 may be used to expand the range of wireless communication between the hub 16 and sensors 22. Although not shown, various components such as sensor interface boards, wireless modules, communication buses, power management units, global positioning system (GPS), modems, WiFi modules, interface adaptors and the like may be included in VAN 12. Further, VAN 12 may also include various actuators and subsystems such as an automatic tire inflation system (ATIS). VAN 12 may utilize various modes of operation to conserve power in battery operated devices.

Figure 2:
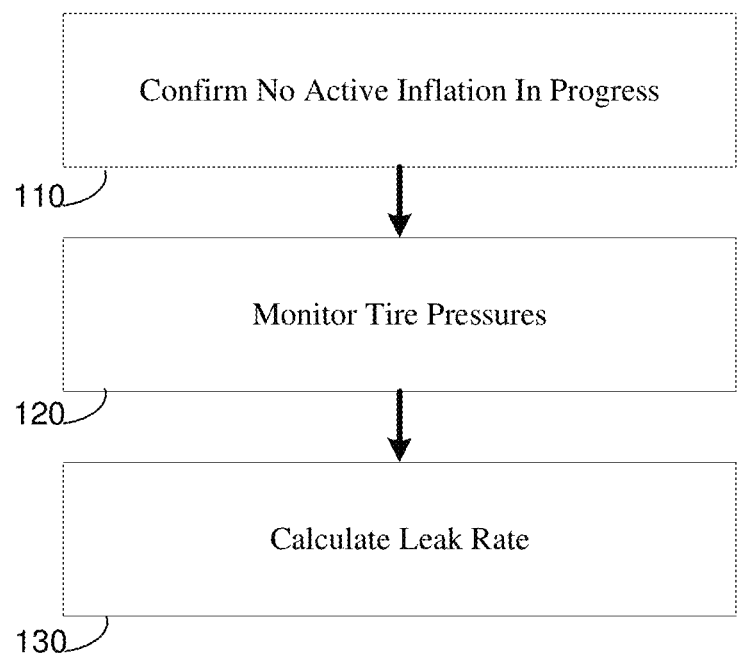
FIG. 2 is a flow chart for a method for using an automatic tire inflation system in accordance with one illustrative embodiment of the present disclosure.

Referring now to FIG. 2, a flowchart 100 showing a method for using an automatic tire inflation system (ATIS) to determine leaks in accordance with one illustrative embodiment of the subject technology is provided. The ATIS may be associated with tractor-trailer vehicle 10 including VAN 12 as described above. The subject technology may be particularly beneficial for self-driving vehicles that may utilize the subject technology to provide warnings and/or take corrective action as a substitute for a visual tire inspection by the driver. Accordingly, embodiments described herein may use an ATIS to automatically detect tire damage. Certain aspects of the ATIS may be embedded in the microcontroller of hub 16 or a separate module in communication with hub 16.

In operation, and as shown in FIG. 2, the supervisory control system may attempt to confirm 110 that there is no active tire re-inflation in progress. Typically, the ATIS may be switched off automatically when the vehicle is stationary and parked so this provides an opportunity to determine leaks. In one embodiment, the leak detection method may be automatically performed at least once each time the vehicle is parked. Once the ATIS is confirmed as inactive, method 100 may proceed to operation 120.

In operation 120, all tire pressures that are part of the ATIS may be monitored at a fast update rate in a synchronized manner. In some embodiments, a wireless tire pressure monitoring system (TPMS) may be used to monitor a rate of tire pressure loss in which pressure readings from one or more sensors may be wirelessly transmitted to a hub receiver/microcontroller for processing. In one illustrative embodiment, an electronic sensor may be used to measure pressure at regular intervals and estimate a pressure loss rate (e.g., leak rate) in mBar/hour. In one particular embodiment, the interval may last approximately 15 minutes. Once the necessary tire pressure readings have been collected, the method 100 proceeds to operation 130.

In operation 130, the leak rate may be calculated based on the tire pressure data. In some embodiments, the leak rate may be calculated by a microcontroller in VAN 12. The microcontroller may compare the leak rate to a stored set value which may represent a threshold rate over which the leak may be considered a concern and/or dangerous. If the tire pressure leak rate exceeds the set value, a fault indicator may be generated so the operator (or any networked entity such as fleet center 14) is made aware of the pressure loss. The fault indicator may include which particular tire is leaking for easy inspection. The fault indicator may include any appropriate notification, including, but not limited to, flashing lights or may illuminate a specific dashboard icon upon starting the vehicle. The fault indicator may also include a text message to a smartphone of the driver or a message presented on a smart device in communication with the VAN. In a self-driving vehicle, the fault indicator may be provided to an external command center so that maintenance or other corrective action beyond trying to re-inflate the potentially faulty tire may be scheduled and performed. If no significant pressure loss is detected in operation 130 (e.g., the leak rate is below the set value), the method 100 of FIG. 2 may be performed again periodically.

Figure 3:
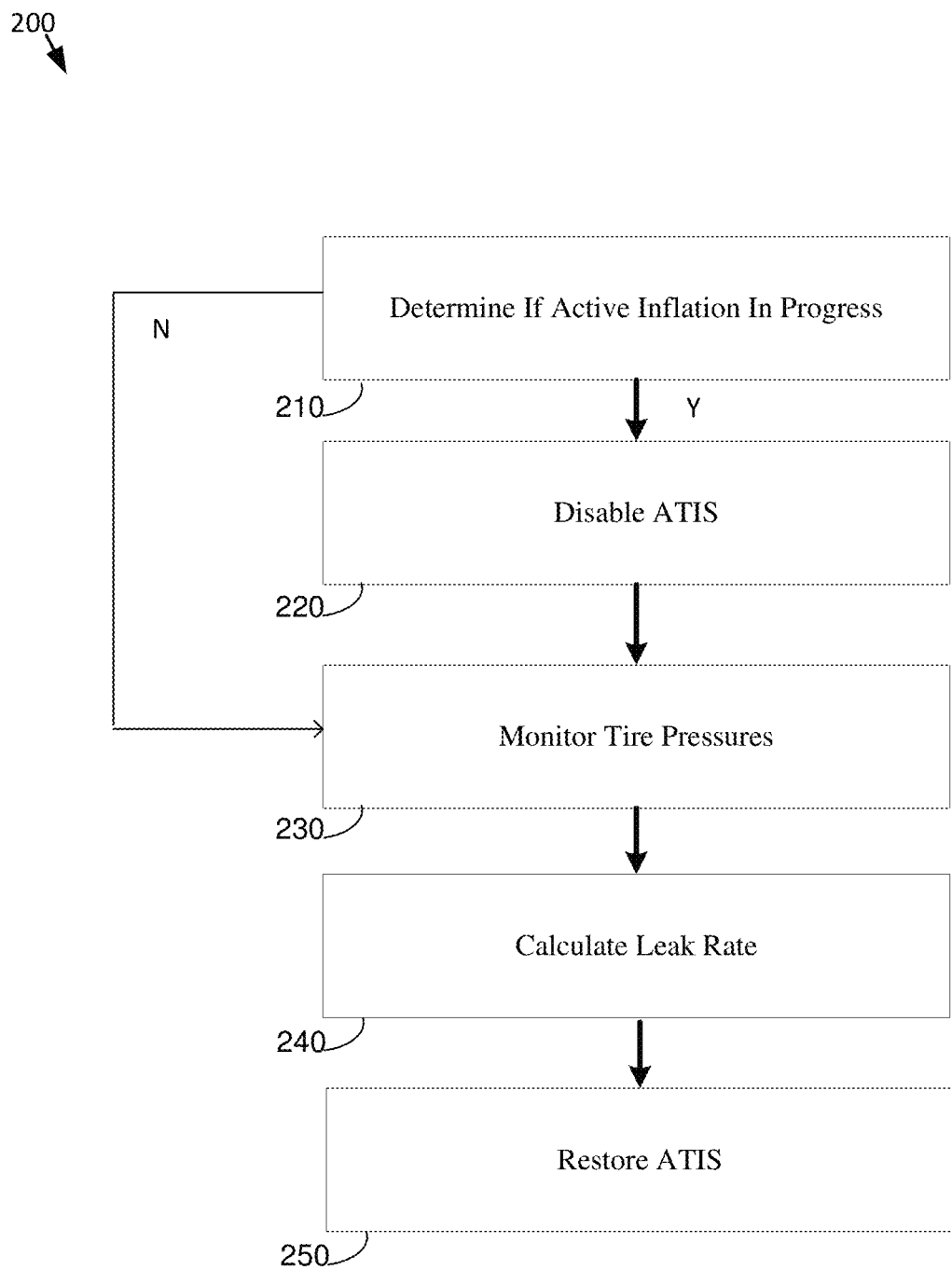
FIG. 3 is a flow chart for another method for using an automatic tire inflation system in accordance with one illustrative embodiment of the present disclosure.

Referring now to FIG. 3, a flowchart 200 showing a method 200 in accordance with another illustrative embodiment of the subject technology is shown. In some embodiments, a supervisory control system may be combined with the ATIS and a tire pressure monitoring system to perform a tire damage detection function. For example, the supervisory control system executes a method 200 including the operations of FIG. 3 within the VAN. In operation 210, the supervisory control system may determine 210 there is no active tire re-inflation in progress. In some embodiments, and as discussed above, the ATIS may be switched off automatically when the vehicle is stationary and parked. However, under certain conditions such as moving smoothly on the highway and/or with no major flow detected in the ATIS, the method 200 may be performed while the vehicle is in motion. In some embodiments, if there is active inflation in progress, the method may pause and repeat step 210 until it determines no inflation is in progress. Additionally and/or alternatively, the method may proceeds to step 220 in which ATIS is proactively disabled.

In operation, if there is active inflation in progress, the method proceeds to disable 220 the ATIS. In some embodiments, the ATIS automatic pressure restoration function may be disabled by removing the delivery line pressure. In some embodiments, operation 220 occurs when the vehicle is parked or when the ATIS is not providing a significant flow of air and the method 200 proceeds to step 230.

If there is no active inflation in progress, the method 200 proceeds to monitor 230 the tire pressure. In some embodiments, all tire pressures that are part of the ATIS may be monitored at a fast update rate. Additionally and/or alternatively, a wireless TPMS may be used to monitor a rate of tire pressure loss. In one illustrative embodiment, an electronic sensor may be used to measure pressure at regular intervals (e.g. every 15 minutes, etc.) and estimate a pressure loss rate in mBar/hour.

In some embodiments, applying the parking brake may serve as a requirement and/or trigger to start monitoring 230 the pressure. In some embodiments, the ATIS may be powered from a failsafe parking brake system so that the ATIS may be inactive when the vehicle is parked. If the ignition or the wireless hub is switched off, the method may assume that the vehicle is parked with the parking brake on.

In some embodiments, one or more electronic sensors 22 may be battery powered so the electronic sensor may operate autonomously and independent of the vehicle systems. In some embodiments, the one or more electronic sensors 22 may utilize a two-way wireless communication network with the VAN. Accordingly, this network may be used to determine: 1) that the ATIS is no longer active and leak measurement may occur, and/or 2) that the ATIS is about to restart signaling that a final measurement and calculation should occur and leak measurement should cease. In some embodiments, ATIS active and inactive states may be inferred by the presence or lack of an acknowledgement over the two-way radio link to messages from the electronic sensor. The supervisory control system may also use a delay to allow the tire temperature to stabilize prior to measurement. Upon completion of monitoring 230 and/or collecting the tire pressure data, the method 200 proceeds to calculate 240 the leak rate.

In some embodiments, method 200 may calculate 240 the leak rate based upon the tire pressure data. If the tire pressure leak rate exceeds a set value, a fault may be generated so the operator is made aware of the pressure loss. The fault may indicate which particular tire is leaking for easy inspection. In a self-driving vehicle, the fault may be provided to an external command center so that maintenance may be scheduled.

In some embodiments, if no significant pressure loss is detected during operation 240, normal ATIS function may be restored 250 after a defined period. Calculating 240 the leak rate may include, if the rate of loss does not exceed the set value over a period of time, continuing to sample pressure over a longer period of time to allow detection of lower magnitude leaks (i.e., leak rates exceeding a lower threshold). The lower magnitude leaks may still warrant attention and thus a separate alert may be provided even though the leak rates do not exceed the initial set value for fault conditions. It is also envisioned that the ATIS could use one-way wireless communication networks to report the leak rate for a short period of time after the vehicle begins moving from a stationary and parked position.

Figure 4:
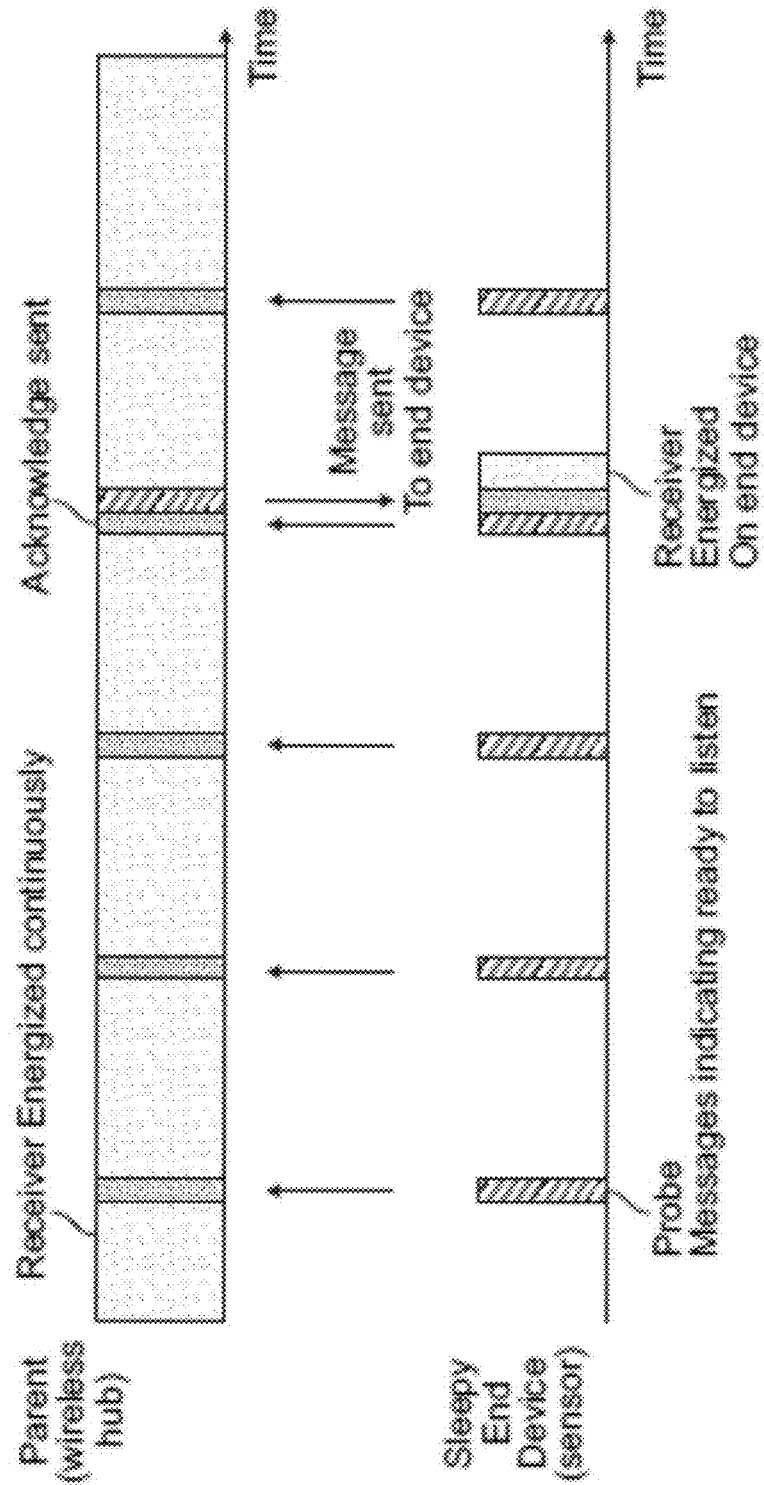
FIG. 4 is a timing diagram using the IEEE 802.15.4 standard with a parent device and an end device in accordance with one illustrative embodiment of the present disclosure.

In some embodiments, a system and method is provided in which tire pressure monitoring may be synchronized from multiple sensors using a two-way communication protocol that enables coordinated data measurements. In one particular embodiment, sensor readings may be coordinated according to IEEE 802.15.4. IEEE 802.15.4 is a standard for short range low power, low data wireless networks. ZigBee and Thread are examples of protocols that use this standard and could be used by the pressure sensors for communication information over the VAN, however these protocols are mentioned merely by way of example as any suitable protocol may be employed without departing from the scope of the present disclosure. An example listen before send arrangement is shown in FIG. 4, in which the parent wireless hub receiver is continuously energized which results in inefficient use of power.

Referring again to FIG. 4, a timing diagram using the IEEE 802.15.4 standard with a parent device and an end device is provided. In some embodiments, the parent device may be a wireless hub that communicates with a variety of end devices such as sensors, range extenders, other wireless hubs, telematics devices and the like. The sensor may be a temperature sensor, load sensor, pressure sensor and the like. In the examples of FIGS. 4-8, the parent device may be a wireless hub and the end device may be a pressure sensor associated with a wheel in an automatic tire inflation system.

In some embodiments, the parent hub may be continuously energized and may periodically receive a message from the pressure sensor indicating that the pressure sensor is in a ready mode to listen/communicate with the parent hub in this way, the pressure sensor may be described as sleepy in that the pressure sensor may be largely in a sleep mode during inactive intervals between ready mode periods. In order to establish communication, the parent hub may transmit a message to the pressure sensor at the proper time as shown in the fourth ready mode period of the pressure sensor. The message energizes the receiver of the pressure sensor and communication occurs. Typically, the pressure sensor provides a signal to the parent hub indicating the inlet pressure for the associated wheel.

Figure 5:
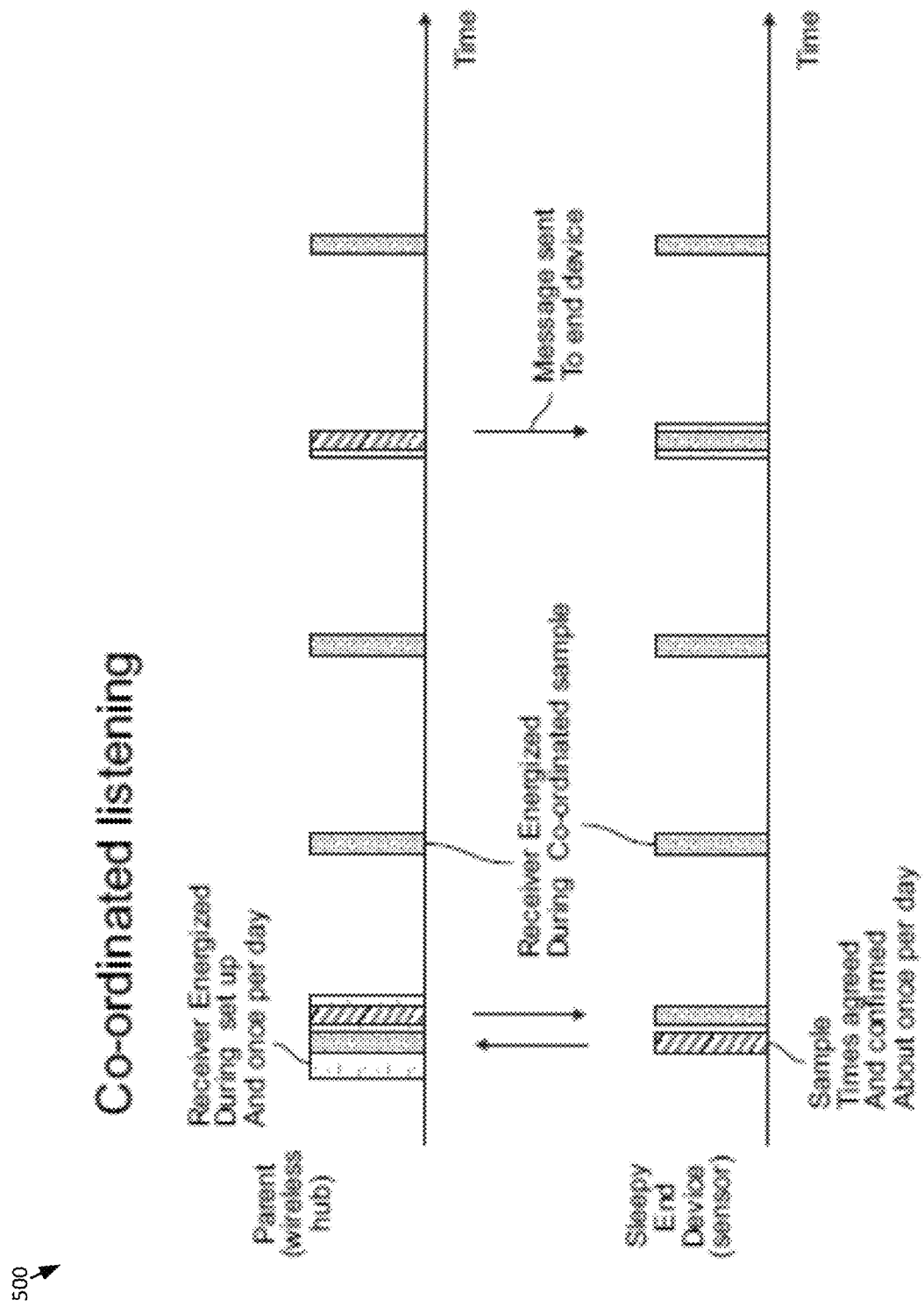
FIG. 5 is another timing diagram illustrating coordinated sampled listening (CSL) using the standardized MAC protocol for IEEE 802.15.4 networks in accordance with one illustrative embodiment of the present disclosure.

Referring now to FIG. 5, another timing diagram showing an example of coordinated sampled listening (CSL) using the standardized MAC protocol for IEEE 802.15.4 networks is provided. CSL is a scheme in which all the nodes in the network agree on a common time reference and then schedule their listening so that all nodes are synchronized active for only a small proportion of time. Generally, CSI may transmit a stream of wake-up frames prior to an actual payload frame. Each wake-up frame contains the time when the transmission of the payload frame may begin. This enables the receiver of a wake-up frame to sleep until the transmission of the payload frame is about to begin, which results in substantial power savings.

In some embodiments, by using CSL, the pressure sensors within the ATIS and/or associated with the TPM system may be coordinated such that the wake up timer causes the sensors to communicate sensor readings simultaneously. In the particular example shown in FIG. 5, the TPM systems may be periodically coordinated such as once per day at a preprogrammed synchronizing time. As shown in the initial active period of coordinating the parent hub and pressure sensor, the parent hub may be energized at the synchronized time and the pressure sensor may generate a confirmation message to the parent hub receiver. The parent hub may send a confirmation message back to the pressure sensor so that the synchronization may be agreed and fully confirmed.

In some embodiments, when using IEEE 802.15.4, the timer may have a resolution of 30.5 us. Using the approach of FIG. 5, the timer may be used to align the sample times across multiple wirelessly connected sensors. When needed, transmissions would only be scheduled when other devices were actively waiting for reception, which may allow for substantial increase in battery life of the sensors and system. As seen in a comparison of FIGS. 4-5, the power consumption of the parent device (e.g., hub or wireless gateway) is reduced because the receiver is off 99% of the time. This may allow better use of bandwidth and longer operation in battery powered modes when the vehicle is stationary. Further, using a common timebase may allow for more accurate measurements when simultaneous measurements are desirable.

For example, FIG. 5 shows a series of ready mode periods. In the fourth ready mode period, the parent hub and the pressure sensor may be simultaneously energized for communication based on the synchronization so that messages sent by the parent hub may be received by the pressure sensor. The messaging may be a request for a pressure reading from the parent hub with the response from the pressure sensor being a pressure reading.

Referring again to FIG. 2, when monitoring 120 pressure using the CSL, knowledge of the pressure across multiple locations simultaneously within the pneumatic system may be captured. By capturing synchronized pressure readings, the flow rate and direction of flow within the system may be estimated or calculated. The direction and flow rate may be used to isolate leaks in the system and tire damage, particularly in the above described system where the pressure delta between two sensors in the wheel end is measured. CSI may also be used in determining the weight of a vehicle in which the measurements from multiple load cells can be synchronized to ensure that movement of the vehicle or the contents cannot cause an invalid measurement.

Figure 6:
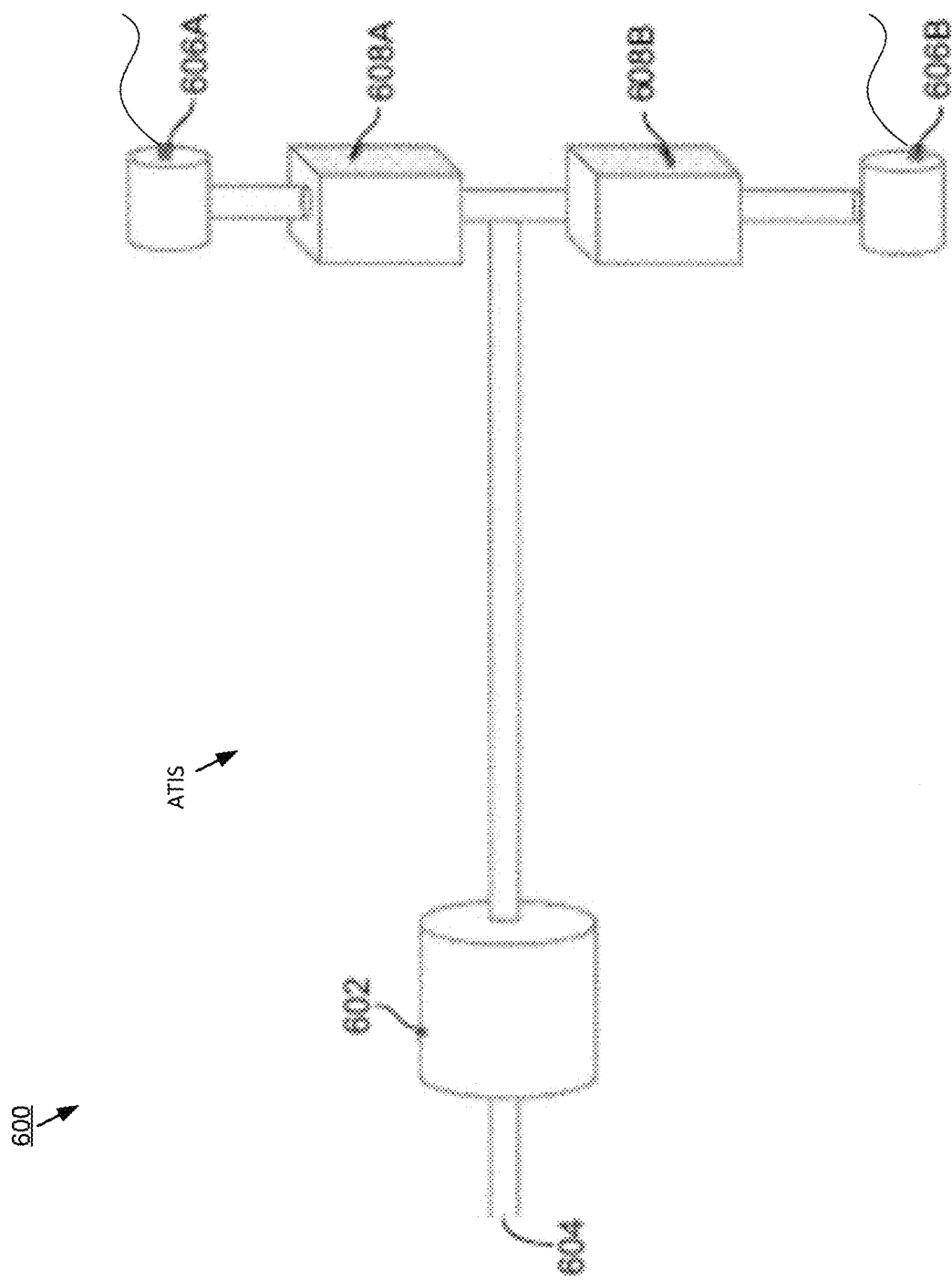
FIG. 6 is a schematic representation of an automatic tire inflation system in accordance with one illustrative embodiment of the present disclosure.

Referring now to FIG. 6, a schematic representation of an automatic tire inflation system (ATIS) 600 for two tires (e.g., tire A and tire B, not explicitly shown) is provided. System 600 includes rotary air union 602 and air inlet 604 from the vehicle axis (not shown). Air inlet 604 may be stationary but passes through rotary air union 602 to the rotating tires. It is envisioned that the tires A, B may be adjacent each other and may operate as an interchangeable pair. Each tire may include a respective wheel valve 608A and 608B that may restrict air into flexible hose 606A (to tire A) and flexible hose 606B (to tire B) that extend to the tire.

Figure 7:
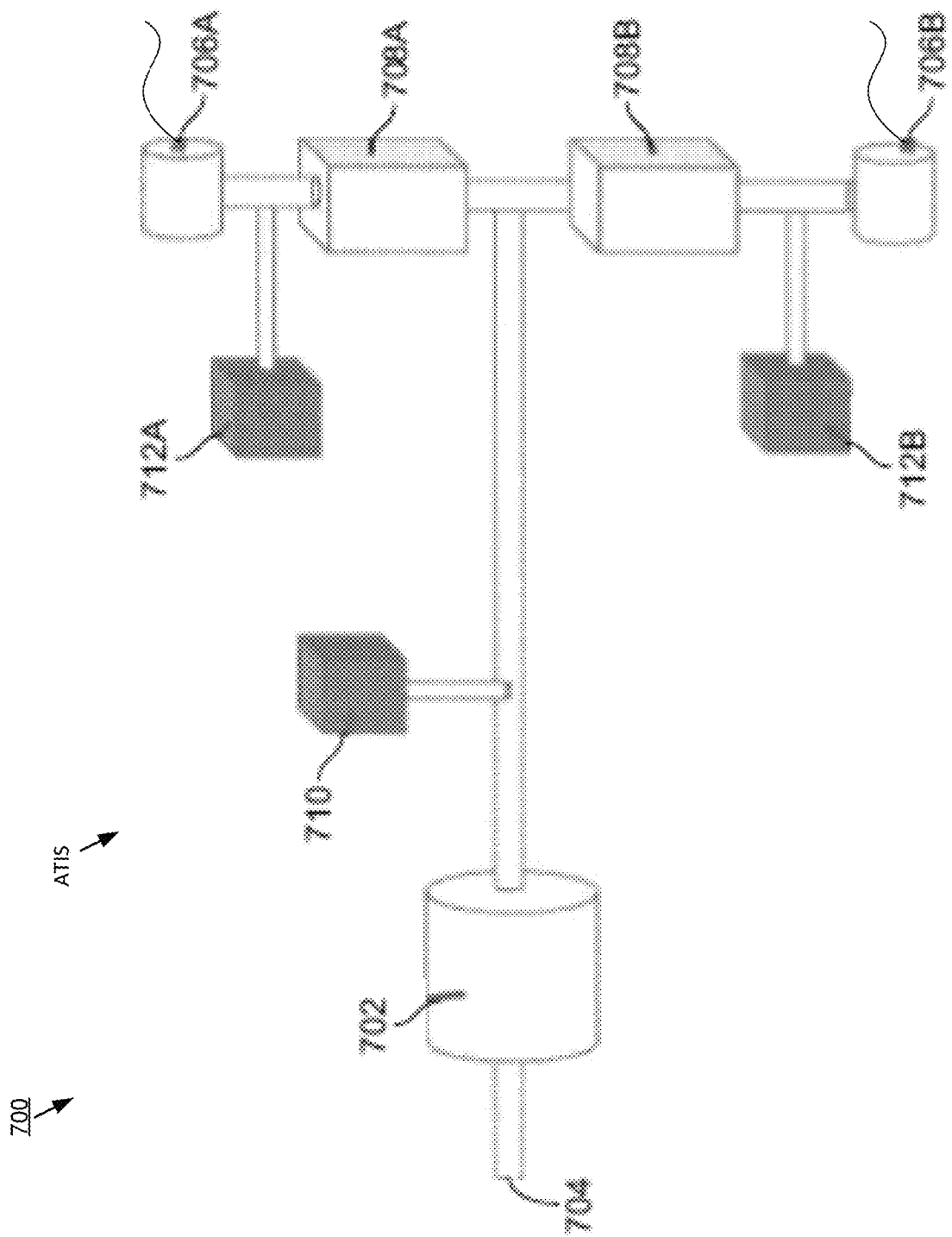
FIG. 7 is a schematic representation of an automatic tire inflation system having several pressure sensors in accordance with one illustrative embodiment of the present disclosure.

Referring now to FIG. 7, a schematic representation of an automatic tire inflation system 700 having several pressure sensors is provided. System 700 includes rotary air union 702 and air inlet 704 from the vehicle axis (not shown) as well as flexible hoses 706A and 706B, and wheel valves 708A and 708B similar to FIG. 6 above. In operation, as gas flows through a restriction such as a pipe, orifice or wheel valve, the pressure drop may be proportional to the flow rate through the restriction. As noted above, the flow rate in an ATIS may indicate a leak. Thus, by having pressure sensors at multiple locations on the vehicle, it may be possible to determine the flow direction and rate by examining the pressure differences at specific instants in time such as when coordinated sampling is utilized (see FIG. 11). An erroneous air flow calculation could result from samples which are not synchronized. Using the coordinated sampling approaches described herein, accurate flow rate measurements are achieved.

In some embodiments, a pressure sensor associated with a specific wheel may determine a flow rate by comparing a system pressure with a pressure measured within the associated tire. In an ATIS, this may be achieved with a pressure sensor coupled to the tire, and a system pressure for the ATIS used as a reference. Some vehicles are equipped with a pressure sensor in the wheel end for each tire and a flow restrictor or wheel valve isolating each tire from the main air delivery line. The ATIS of FIG. 7 may include inlet pressure sensor 710 downstream of the rotary air union 702 and wheel pressure sensors 712A and 712B for each wheel respectively.

Figure 8:
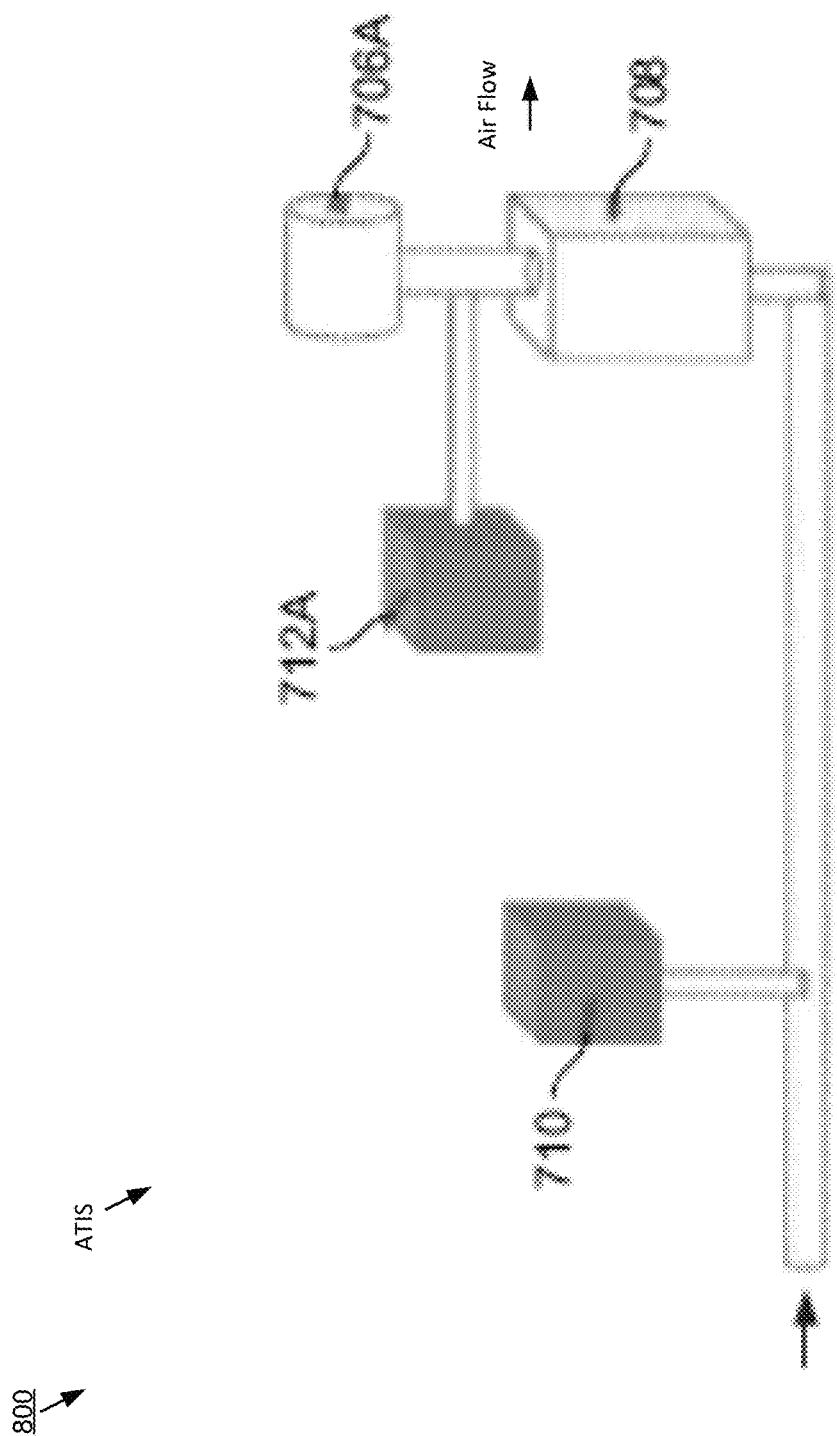
FIG. 8 is a portion of the schematic representation of FIG. 7 with flow arrows in accordance with one illustrative embodiment of the present disclosure.

Referring now to FIG. 8 a diagram 800 showing a portion of an ATIS relevant to tire A of FIG. 7 is shown. In some embodiments, inlet pressure sensor 710 within the wheel end may measure system delivery pressure. Pressure sensor 712A may measure pressure after the wheel valve. The flow rate local to the wheel end may be measured by comparing the inlet pressure sensor measurement to the pressure sensor measure in the wheel end. In other words, the pressure delta may be equal to the inlet pressure measurement from the inlet pressure sensor minus the pressure measure from the pressure sensor A. The air flow may be determined based upon the pressure delta and the known restriction or orifice of the wheel valve (e.g. pressure delta/restriction of wheel valve). Accordingly, the air flow measurement may be a self-contained flow rate measurement function for each wheel end. For example, for systems with two output pressure ports and two tire pressure sensors in each wheel end, a third inlet pressure sensor within the wheel end may be added to accomplish locally determining the flow rate to each tire.

In some embodiments, the ATIS may include a valve within the wheel end for distributing pressure to the tires and isolating the tires from the ATIS when necessary. A pressure sensor may be included in the wheel end to detect pressure at the outlet of these wheel end valves. Another pressure sensor may be added to the inlet line to the wheel end assembly so that a pressure difference across each wheel valve may be measured. Measuring the pressure delta across the wheel valves allows the flow rate through the valve to be estimated. Similar to above, the flow rate, and particularly a flow rate exceeding a predetermined threshold value, may indicate damage and provide information on the potential severity (i.e., the size of punctures in the tire). Using the teachings of the present disclosure, the leak rate may be measured while the vehicle is in motion and the ATIS is actively re-inflating a damaged tire.

Figure 9:
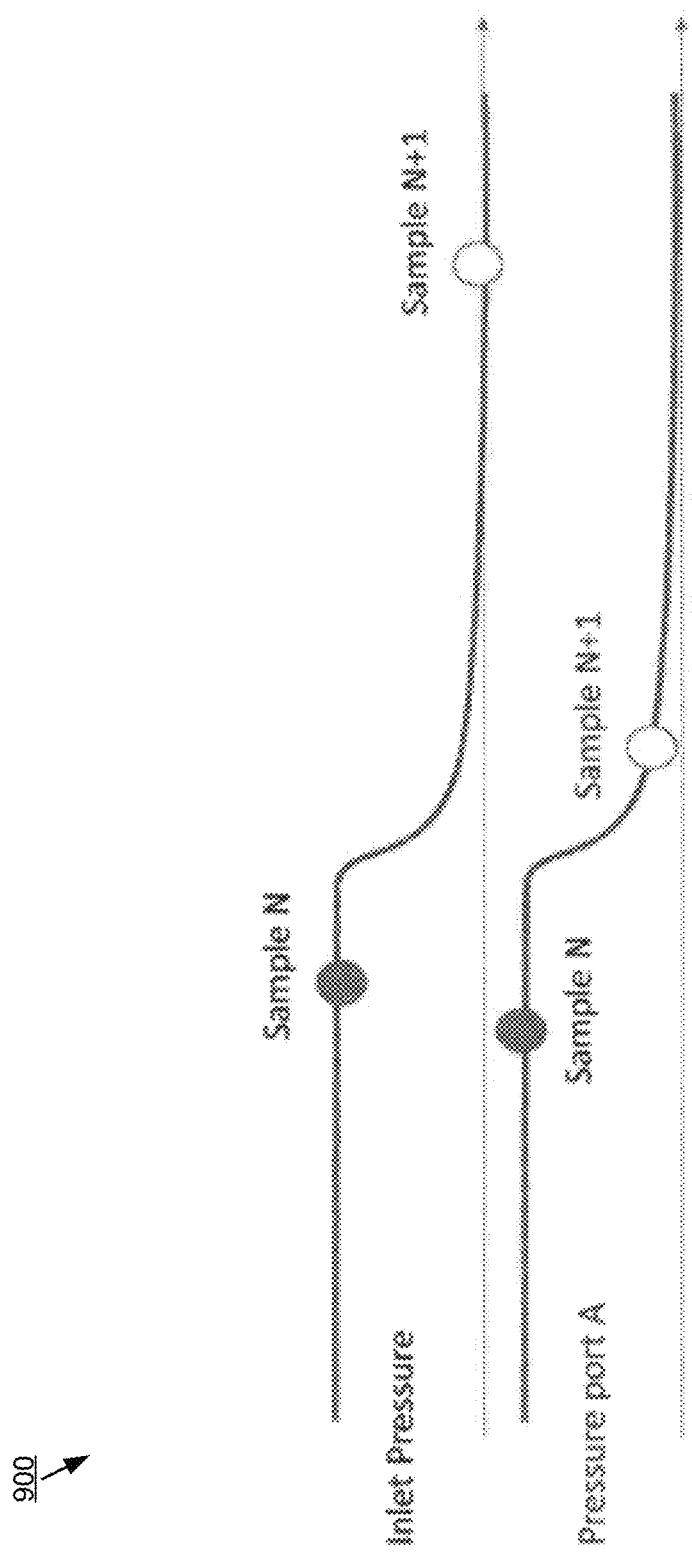
FIGS. 9 and 10 are diagrams of readings from an inlet system pressure sensor and a wheel specific pressure sensor over time in accordance with one illustrative embodiment of the present disclosure.
Figure 10:
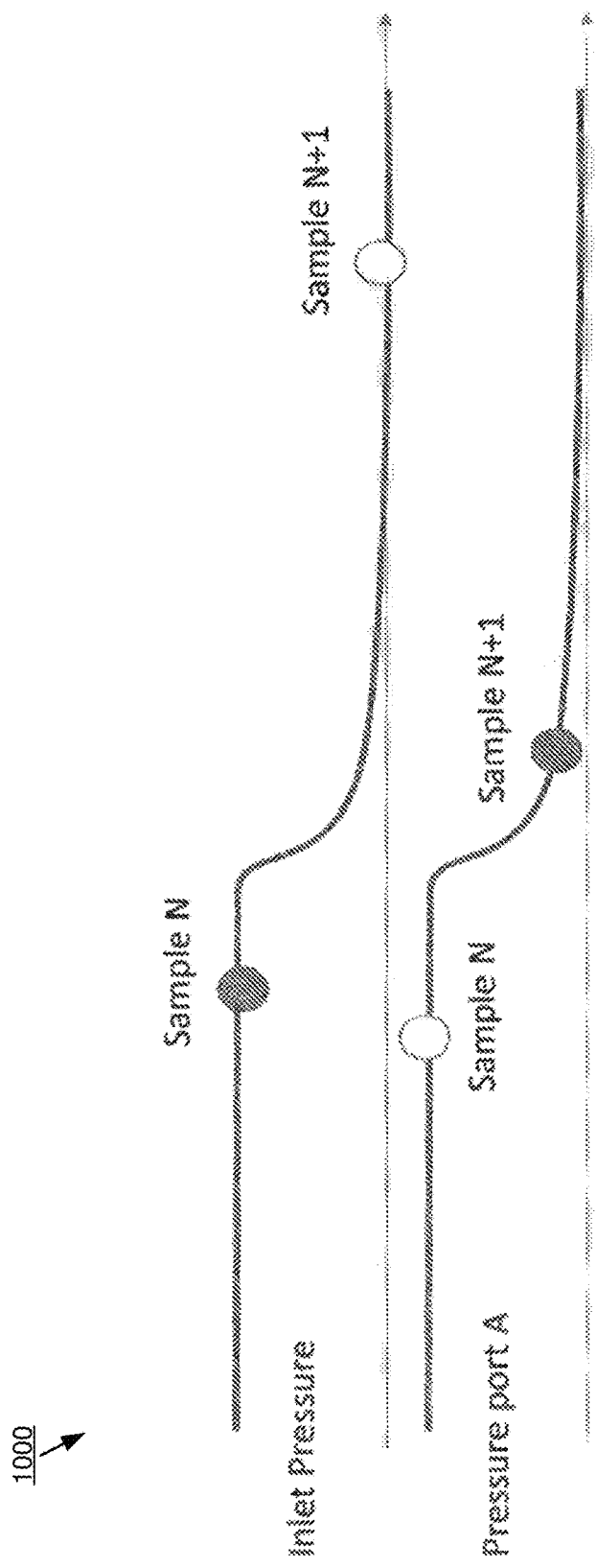

Referring now to FIGS. 9 and 10, pressure readings from an inlet pressure sensor and a pressure port A are shown in the same graph. The inlet pressure sensor may be as shown in FIGS. 7 and 8. The pressure port A may be the pressure sensor A as shown in FIGS. 7 and 8. As can be seen in FIGS. 9 and 10, sampling the readings at different times may not result in accurate results due to conditions changing rapidly over time.

Figure 11:
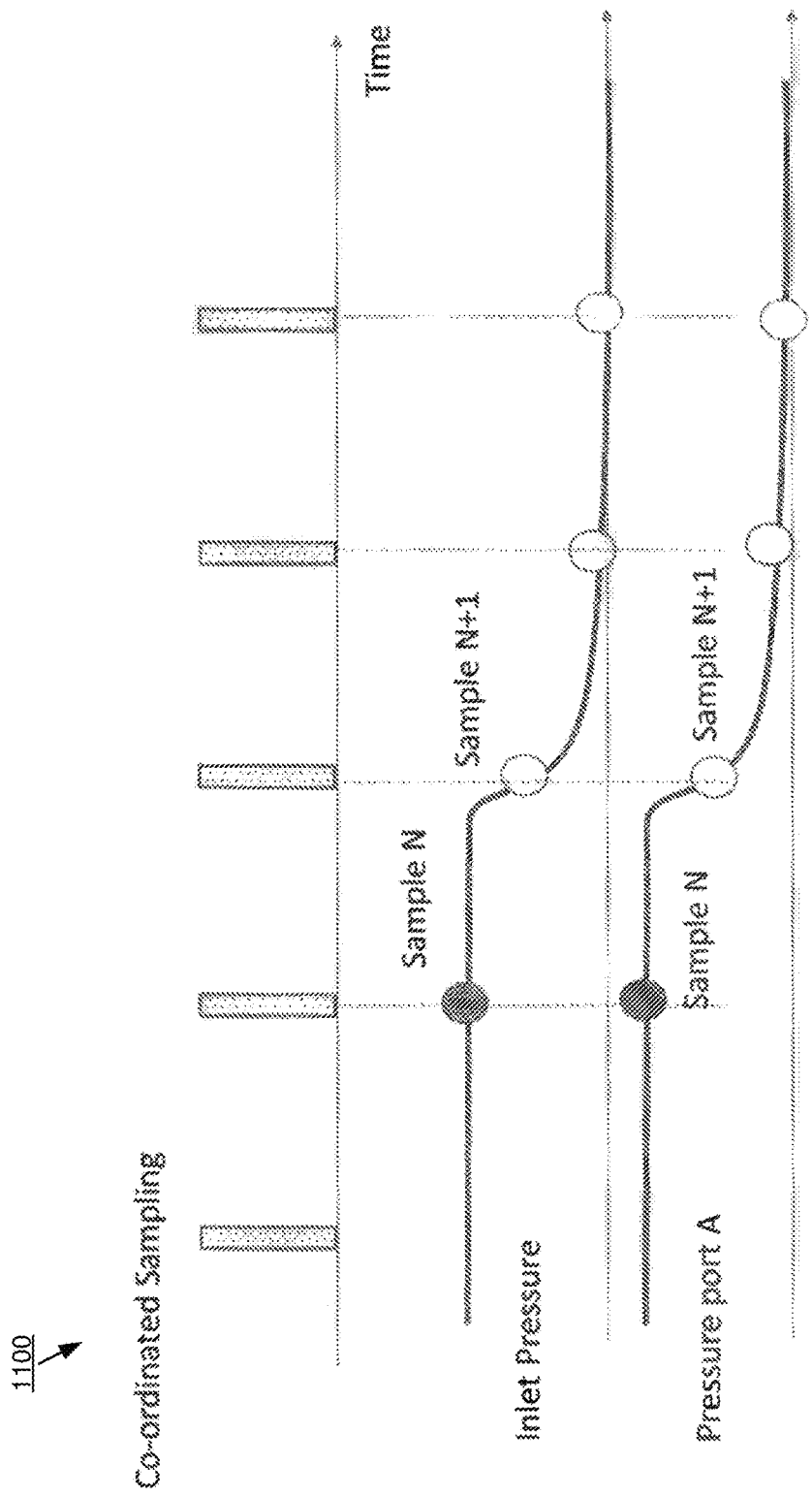
FIG. 11 is a diagram of readings from an inlet system pressure sensor and a wheel specific pressure sensor over time using coordinated sampling in accordance with one illustrative embodiment of the present disclosure.

Referring now to FIG. 11, a diagram of readings from an inlet system pressure sensor and a wheel specific pressure sensor over time using coordinated sample is provided. The diagram of FIG. 11 again includes readings from an inlet pressure sensor and a pressure port A. However, the diagram also includes a CSI control line that has intervals synchronized as noted above. By synchronizing the readings from the pressure sensors, accurate information may be used for the subsequent analysis of the conditions. For example, in the second ready interval, sample readings N may be taken from each sensor at the same time. Subsequent ready intervals can take sample readings N+1, etc. with each reading being synchronized for accuracy.

In some embodiments, by using CSI in the VAN, power consumption of the parent devices (e.g., wireless hubs, gateways, range extenders and the like) have reduced power consumption because the parent device only needs to be on during the ready intervals. In some cases, the parent devices may be off approximately 99% of the time. As a result, battery powered modes and devices have longer life. Further, the device bandwidth may be used more efficiently in addition to the common timebase providing more accurate measurements of dynamic systems.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

The invention claimed is:

1. A method for monitoring tire pressure comprising:
confirming, using a battery powered electronic sensor, that there is no active tire re-inflation in progress;
monitoring, using the battery powered electronic sensor, a status of all tire pressures over a period of time;
determining, using the battery powered electronic sensor, whether a rate of tire pressure reduction exceeds a first value;
reporting, using the battery powered electronic sensor, a fault if the rate exceeds the first value; and
determining whether the rate of tire pressure reduction exceeds a second value less than the first value; and
reporting a different fault if the rate exceeds the second value.

2. The method of claim 1, further comprising:
disabling an automatic pressure restoration function in order to facilitate a measurement, and
restoring the automatic pressure restoration function after a predetermined time.

3. The method of claim 1, further comprising:
determining, using the battery powered electronic sensor, that an automatic tire inflation system is no longer active.

4. The method of claim 1, further comprising:
receiving, using the battery powered electronic sensor, an indication that an automatic tire inflation system is approaching a restart.

5. The method of claim 3, wherein determining utilizes a two-way radio link.

6. An automatic tire inflation system comprising:
a plurality of pressure sensors forming part of a wireless network, wherein the plurality of pressure sensors are configured to determine that an automatic tire inflation system is no longer active; and
a controller, the controller managing a timing function within each of the plurality of pressure sensors to determine a pressure sensed by each of the plurality of pressure sensors at a given time,
wherein the system is configured to receive, using the plurality of pressure sensors, an indication that an automatic tire inflation system is approaching a restart.

7. The automatic tire inflation system of claim 6, wherein the controller determines a flow rate in the system based on a comparison of the pressures sensed by the plurality of sensors.

8. The automatic tire inflation system of claim 6, wherein the plurality of sensors include a battery powered electronic sensor.

9. The automatic tire inflation system of claim 6, wherein determining utilizes a two-way radio link.

10. A method for automatic tire inflation comprising:
providing an automatic tire inflation system (ATIS) on a vehicle;
determining that the ATIS is inactive using a battery operated electronic sensor;
monitoring, using the battery operated electronic sensor, the status of all tire pressures over a period of time;
determining, using the battery operated electronic sensor, whether a rate of tire pressure reduction exceeds a first value;
reporting, using the battery operated electronic sensor, a fault if the rate exceeds the first value; and
determining, using the battery powered electronic sensor, that an automatic tire inflation system is no longer active or receiving, using the battery powered electronic sensor, an indication that an automatic tire inflation system is approaching a restart.

11. The method of claim 10, further comprising:
determining whether the rate of tire pressure reduction exceeds a second value less than the first value; and
reporting a different fault if the rate exceeds the second value.

12. The method of claim 10, wherein determining that the ATIS is inactive utilizes a two-way radio link.

13. An automatic tire inflation system comprising:
a plurality of pressure sensors forming part of a wireless network, wherein the plurality of sensors are configured to receive an indication that an automatic tire inflation system is approaching a restart;
a controller, the controller managing a timing function within each of the plurality of sensors to determine a pressure sensed by each of the plurality of sensors at a given time, wherein the controller is configured to disable an automatic pressure restoration function in order to facilitate a measurement and to restore the automatic pressure restoration function after a predetermined time.

* * * * *